(12) United States Patent
Li (10) Patent No.: US 7,777,724 B2
(45) Date of Patent: Aug. 17, 2010

(54) DUSTFREE AND WATERPROOF ROLLING-BALL OPTICAL MOUSE

(76) Inventor: Wei Gao Li, No. 327, Li Feng Ge, Li Hu Village, Bu Ji Town, Shenzhen (CN)

( * ) Notice: Subject to any disclaimer, the term of this patent is extended or adjusted under 35 U.S.C. 154(b) by 894 days.

(21) Appl. No.: 11/520,153

(22) Filed: Sep. 13, 2006

(65) Prior Publication Data

US 2007/0146328 A1 Jun. 28, 2007

(30) Foreign Application Priority Data

Dec. 23, 2005 (CN) ............. 2005 1 0120899

(51) Int. Cl.
*G06F 3/033* (2006.01)
(52) U.S. Cl. ........................................ 345/167
(58) Field of Classification Search ........ 345/166, 345/163–167; 463/37; D14/402–410, 417
See application file for complete search history.

(56) References Cited

U.S. PATENT DOCUMENTS

| | | | | |
|---|---|---|---|---|
| 5,214,415 A | * | 5/1993 | Pandolei | 345/164 |
| 5,486,845 A | * | 1/1996 | Chait | 345/163 |
| 6,129,092 A | * | 10/2000 | Mondl et al. | 134/6 |
| 7,317,446 B1 | * | 1/2008 | Murphy | 345/163 |
| 2002/0109674 A1 | * | 8/2002 | Tada et al. | 345/167 |
| 2004/0036677 A1 | * | 2/2004 | Ono et al. | 345/167 |
| 2005/0162390 A1 | * | 7/2005 | Selby et al. | 345/163 |
| 2006/0109248 A1 | * | 5/2006 | Su | 345/167 |

FOREIGN PATENT DOCUMENTS

| CA | 2169010 | * | 8/1997 |
|---|---|---|---|
| JP | 8297538 | * | 11/1996 |

* cited by examiner

*Primary Examiner*—Chanh Nguyen
*Assistant Examiner*—Robert M Stone
(74) *Attorney, Agent, or Firm*—Hamre, Schumann, Mueller & Larson, P.C.

(57) ABSTRACT

A dustfree and waterproof rolling-ball optical mouse includes a concave housing; a rolling ball movably engaged with the concave housing; a dustproof gasket fixed on the concave surface of the concave housing; a leakage hole of a conduit defined in a center of the concave surface of the concave housing; an aperture for allowing light through which is eccentrically defined in the bottom of the concave surface of the concave housing; and a waterproof tab formed around the edge of the aperture.

8 Claims, 12 Drawing Sheets

DUSTFREE AND WATERPROOF ROLLING-BALL OPTICAL MOUSE

BACKGROUND OF THE INVENTION

1. Field of the Invention

The present invention relates to a computer device and more specifically to a dustfree and waterproof rolling-ball optical mouse that could be used jointly with the key board or separately.

2. Description of the Prior Art

Existing optical mouse usually have common functions by way of emitting light which is then reflected by the desktop.

No matter wired or wireless optical mouse, they all require a work space. In other words since the concave housing requires certain moving space for operation, the mouse thus shares with the user the limited use space on the desktop, creating congestion and in convenience. In addition, when used for a long time, the palm, fingers and arm of the user are subjected to fatigue.

This kind of a rolling-ball optical mouse is fashioned to overcome the aforesaid shortcomings. 1. It does not require to move the mouse body when using and also 2. It does not need a mouse pad. 3. More over the common operational functions are achieved engaging the rolling process about a fixed point of the rolling ball and the optical coupling device with the aid of the functional keys.

Also in the course of frequent use, the mouse is prone to infiltration of dust as the opening around the ball allows movement of air. Eventually as accumulation of dust keeps piling up, the internal circuits of the mouse will be adversely affected. In addition, infiltration of liquids such as drops of water could equally. Affect the printed circuit board's operation and render the device ineffective and possibly obsolete. More over when the position device is not set, the mouse could easily develop undue sliding relatively lose to the table top. Thus from the above, the conventional optical mousse need further improvement.

It is also important to note that conventional key board and mouse are both separate peripheral devices of personal computers. In other words it has not been easy to combine a mouse and a keyboard to form a whole. As a matter of fact, none of the existing mouse has the ability to be used separately and also jointly with the keyboard in combined operation.

In this era of technological development and update of products, existing optical mouse apparently needs further improvement in order to meet the increasing demand of the growing market. Therefore, it is hoped the above technological invention is a welcoming inclusion and a step in the right direction.

BRIEF SUMMARY OF THE INVENTION

A primary object of the present invention is to provide a dustfree and waterproof rolling-ball optical mouse, especially devised to prevent dust and expel liquid drops from its system, so as to improve its technical efficiency.

To achieve the above-mentioned object, a dustfree and waterproof rolling-ball optical mouse comprises: a concave housing; a rolling ball movably engaged with said concave housing; a dustproof gasket fixed on the concave surface of the concave housing; a leakage hole of a conduit defined in a center of said concave surface of said concave housing; an aperture for allowing light through which is eccentrically defined in the bottom of said concave surface of said concave housing; and a waterproof tab formed around the edge of said aperture.

Advantageously, said dustproof gasket is made of smooth wool strip which forms a plurality of ciliary bodies on the surface to be frictionally engaged with said rolling ball, and a dustproof lid is mounted on said dustproof gasket.

Advantageously, said leakage hole forms a leakage nozzle to cover or insert into one end of said conduit and the other end of said conduit is fixed on an external face of the bottom of said concave housing.

Advantageously, a banding opening is respectively structured on both sides of the bottom of said concave housing allowing a banding passage through.

Advantageously, at least one metal deformable strip is fixed on the bottom of said concave housing and the quantity of said deformable strip is preferably two.

Advantageously, a flex device is provided which includes an upper lid, a lower lid, a spiral spring and a turnplate.

Advantageously, a track and an elastic ball are arranged on said turnplate with a spiral spring and a wire flex coiled in said turnplate, and an adhesive tape is formed on an end of said flex.

Advantageously, a haptor is fixedly formed on the bottom of said concave housing.

Advantageously, a magnet is fixedly set on the bottom of said concave housing.

Advantageously, a plurality of slots are arranged on the concave surface Of said concave housing and a multiple of corresponding rolling beads are also mounted thereon respectively for movably supporting said rolling ball; said rolling ball has a powdery surface and microdot/gridding surface and preferably the quantity of both slots and beads is three.

Advantageously, a lens and an optical IC are both in turn defined on a printed circuit board below the concave surface of said concave housing.

Advantageously, said lens includes an input convex lens and a sensitive convex lens engaged with said rolling ball.

Advantageously, a light emitting diode is provided to engage with said input convex lens.

Advantageously, a sensitive hole is defined in said optical IC for facing to said sensitive convex lens.

Advantageously, said rolling ball is a transparent ball and a secondary coil and LEDs connected thereto are both defined within said rolling ball 3, and a primary coil corresponding to said secondary coil is formed on a bottom case.

Advantageously, a plurality of luminotrons are arranged on said concave surface of said concave housing.

Advantageously, a luminous layer is defined onto a surface of said rolling ball which is luminous printing ink, luminous powder or luminous sheet.

In accordance with the present invention, 1. The usual operating pattern of all optical mouse has been changed through the improved sensitive structure and construction. Unlike the usual, it only requires roll operation of the rolling ball with the aid of corresponding functional keys to achieve the desired operational functions of optical mouse (without moving the mouse body). 2. Most importantly, this new design prevents dust and water from entering its internal circuit in order to improve it reliability and efficiency. 3. Moreover, there are several ways of position for the user to operate, which makes its use more convenient and flexible.

Other objects, advantages and novel features of the present invention will become more apparent from the following

DETAILED DESCRIPTION OF THE INVENTION

Figure 1:
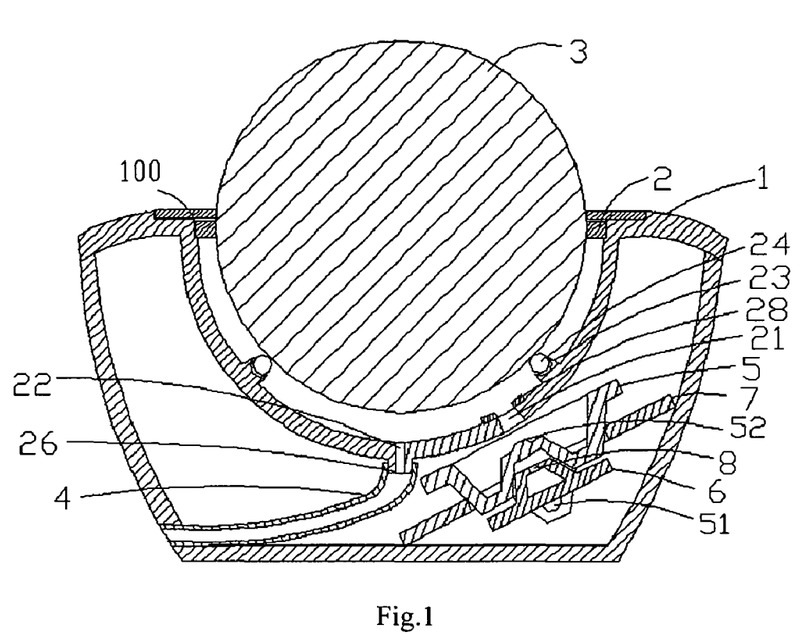
FIG. 1 is a cross-sectional view of a dustproof and waterproof optical mouse in accordance with the present invention.
Figure 2:
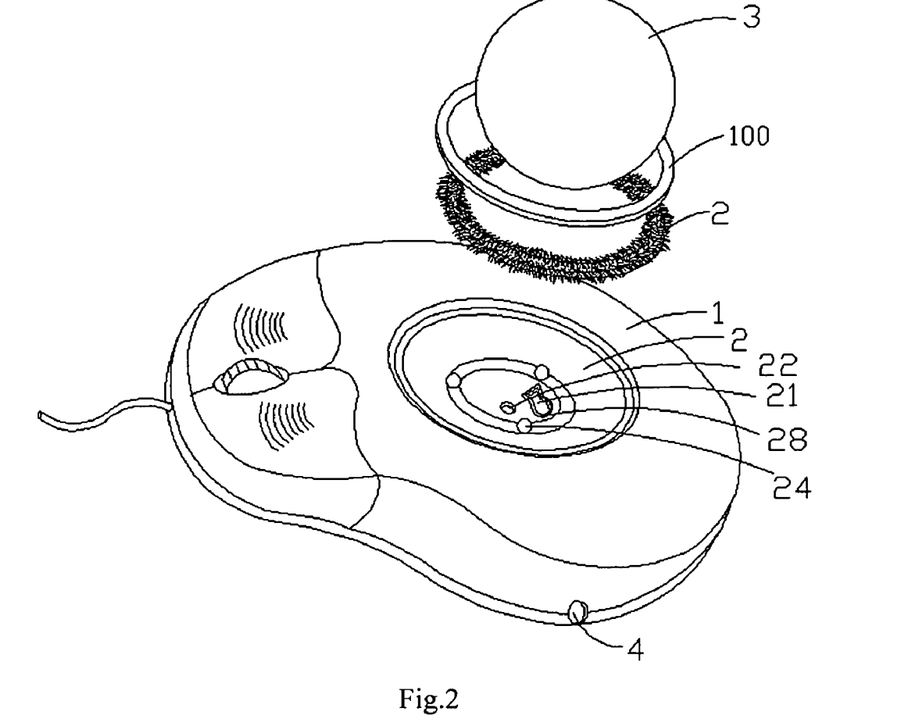
FIG. 2 is an exploded perspective view of the dustproof and waterproof optical mouse in accordance with the present invention.

Referring to FIGS. 1-2, a dustproof and waterproof optical mouse having a rolling ball in accordance with the present invention includes a concave housing 1 and a rolling ball 3 movably engaged with the concave housing 1. A dustproof gasket 2 which is a smooth wool strip forming a plurality of ciliary bodies on a surface thereof, is coiled and fixed on an edge of a concave face of the concave housing 1. A perimeter of the dustproof gasket 2 is corresponding to that of the edge of the concave face. The gasket 2 is tightly rubbing face with the rolling ball 3 as a dustproof mechanism, but at the same time minimizing friction between the ball 3 and the gasket 2. A dustproof lid 100 is mounted on the dustproof gasket 2. A leakage hole 22 of a conduit 4 is defined in a center of a bottom of the concave face of the concave housing 1. An aperture 21 for allowing light to pass through is eccentrically defined in the bottom of the concave face. A waterproof tab 28 is formed along the edge of the through hole 21. The leakage hole 22 forms a leakage nozzle 26 to cover or insert into one end of the conduit 4. The other end of the conduit 4 is fixed on an external face of the bottom of the concave housing 1.

A lens 5 and an optical IC 6 are in turn defined on a printed circuit board 7 below the concave face of the concave housing 1. The lens 5 includes an input convex lens 51 and a sensitive convex lens 52 engaged to the rolling ball 3. An LED is also provided to link with the input convex lens 51. A sensitive hole 8 is defined in the optical IC 6 to face with the sensitive convex lens 52. A plurality of slots 23 are arranged on the concave face of the concave housing 1. A plurality of corresponding rolling beads 24 are mounted on the slots 23 respectively to movably support the rolling ball 3. The rolling ball 3 has a powdery and/or microdot/gridding surface. Preferably, the quantity of both the slots and the rolling beads is three.

Figure 3:
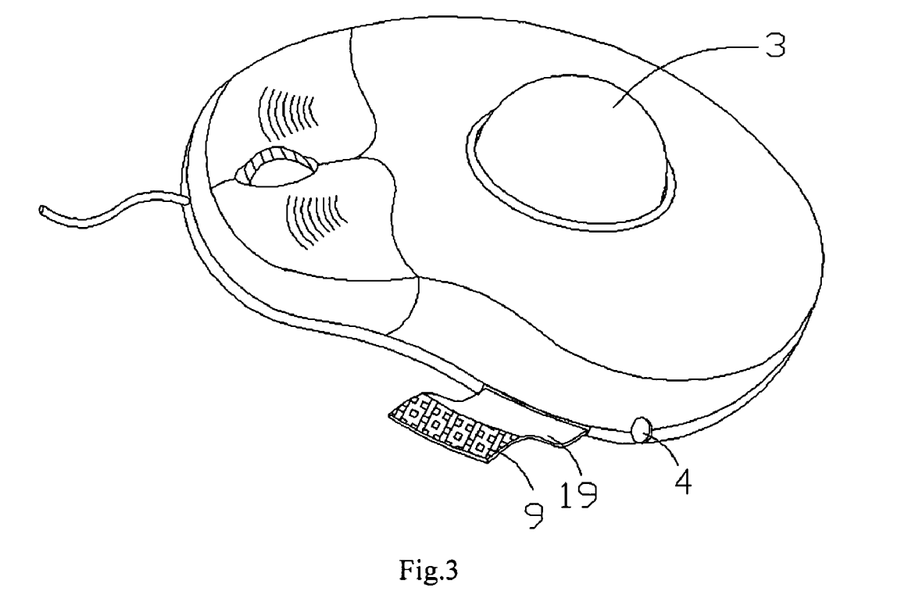
FIG. 3 is a structural schematic view of the first embodiment in accordance with the present invention.
Figure 4:
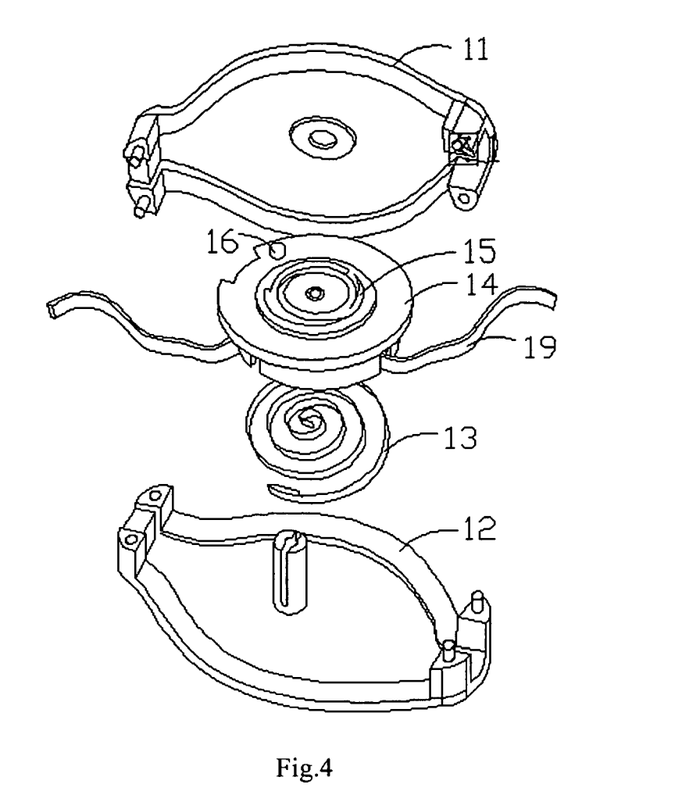
FIG. 4 is a schematic view showing the use of FIG. 3.

Referring to FIGS. 3-4, a flex device includes an upper lid 11, a lower lid 12, a spiral spring 13 and a turnplate 14. A track 15 and an elastic ball 16 are arranged on the turnplate 14. The spiral spring 13 is coiled in the turnplate 14. A flex wire 19 with an adhesive tape-cover 9 also coils around the turning plate 14.

Figure 5:
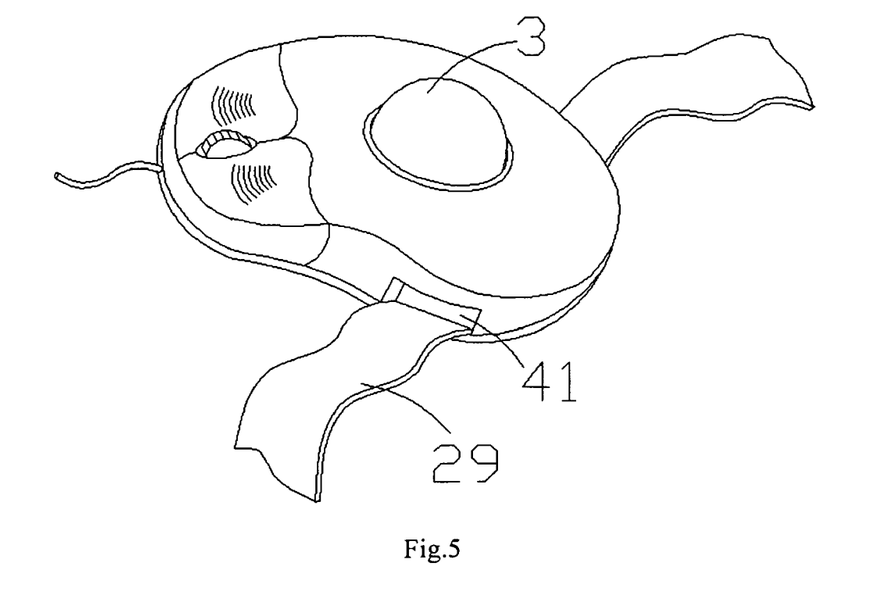
FIG. 5 is a structural schematic view of the second embodiment in accordance with the present invention.
Figure 6:
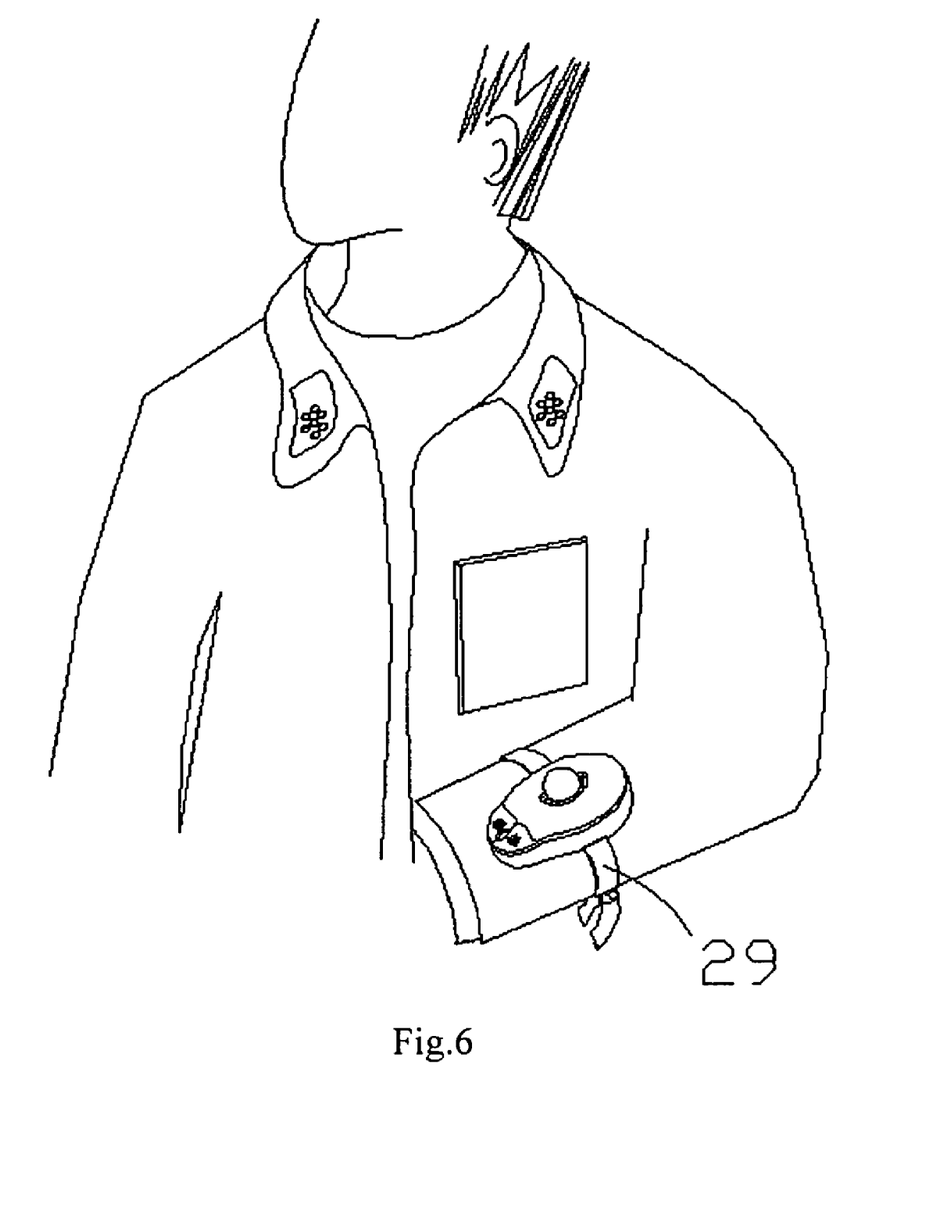
FIG. 6 is a schematic view showing the use of FIG. 5.

Referring to FIG. 5, a banding opening 41 is respectively created in both sides of the bottom of the concave housing 1 to allow a banding passage 29 through. In FIG. 6, this is only to expand the banding 29 and be able to wrap it around the arm of the user and then be fixed and stable.

Figure 7:
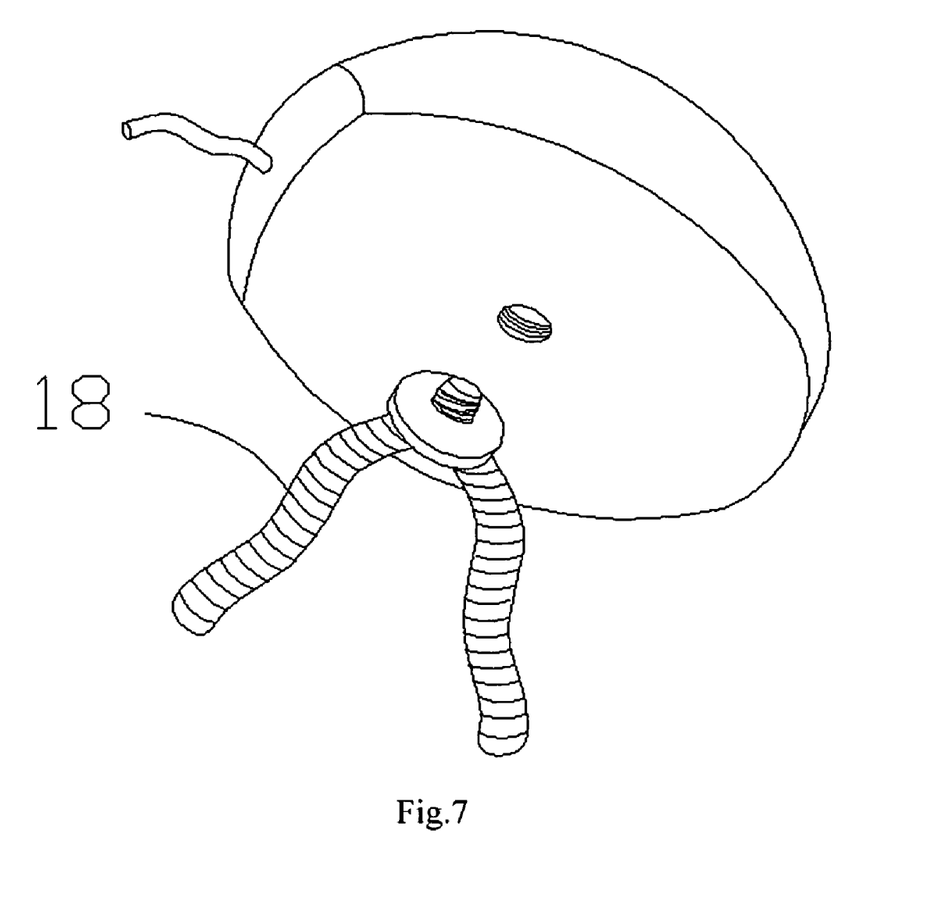
FIG. 7 is a structural schematic view of the third embodiment in accordance with the present invention.
Figure 8:
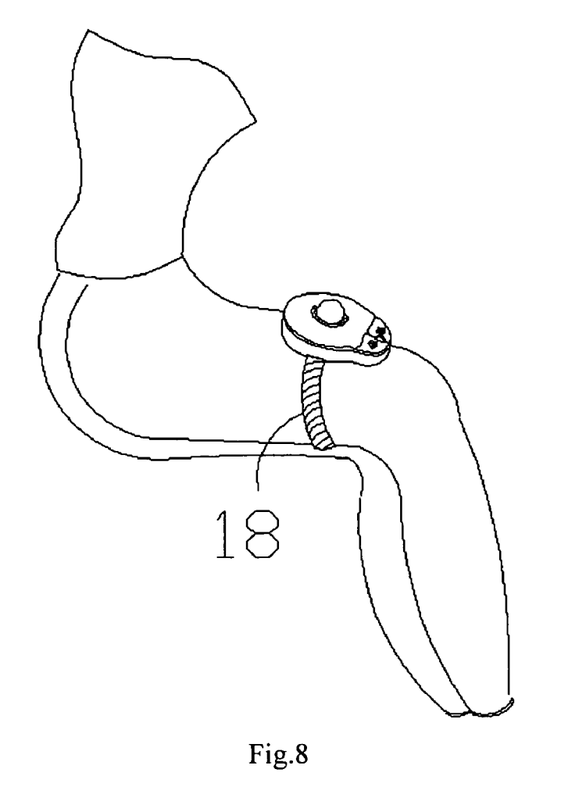
FIG. 8 is a schematic view showing the use of FIG. 7.

Referring to FIGS. 7-8, two metal deformable strips 18 fixed on the bottom of the concave housing 1 are used to wrap around the leg of the user to operate.

Figure 9:
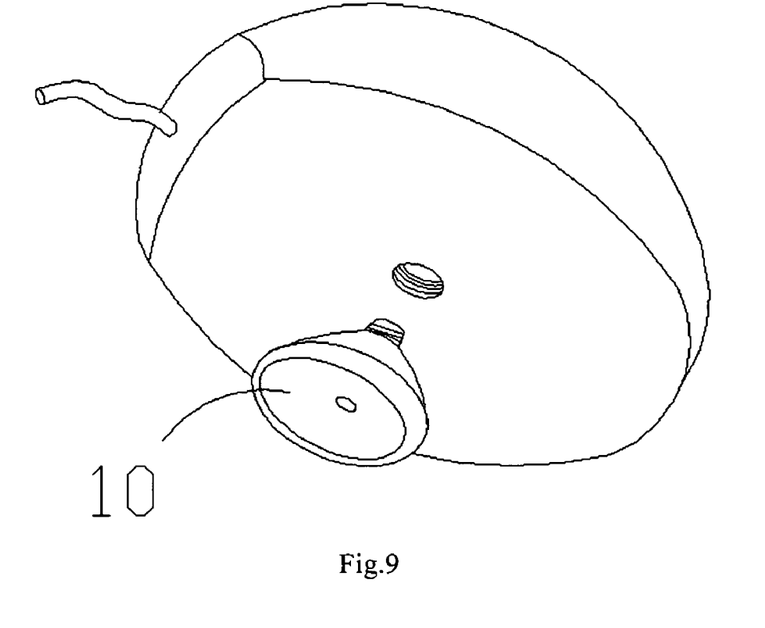
FIG. 9 is a structural schematic view of the fourth embodiment in accordance with the present invention.
Figure 10:
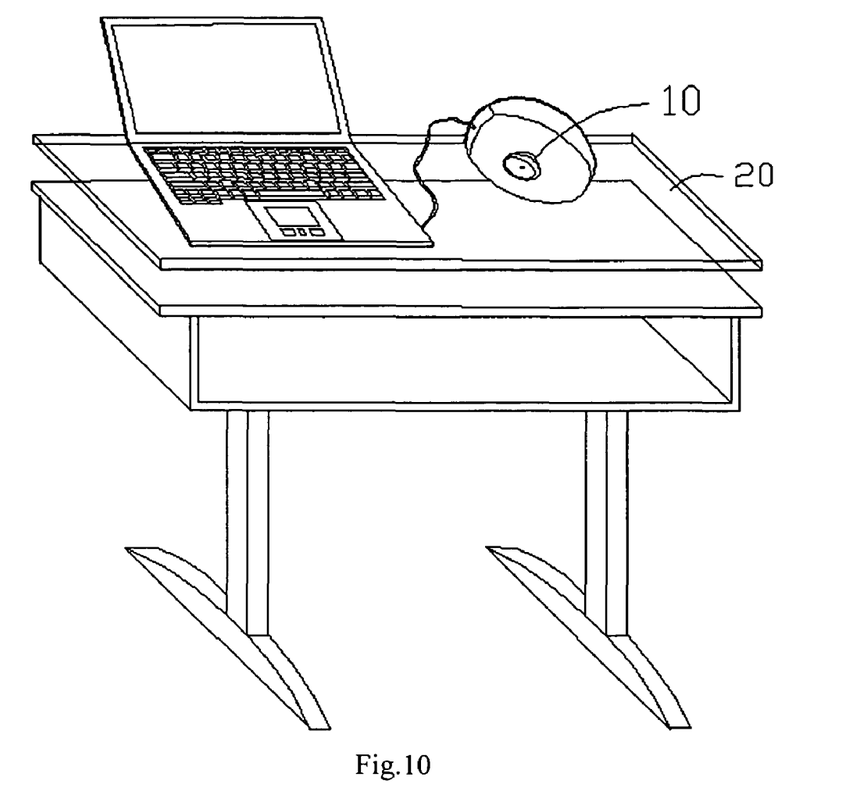
FIG. 10 is a schematic view showing the use of FIG. 9.

Referring to FIGS. 9-10, a haptor 10 is fixedly formed on the bottom of the concave housing 1. This is used to firmly hold onto the glass table 20. Notably, this can also be applied for other smooth surfaces.

Figure 11:
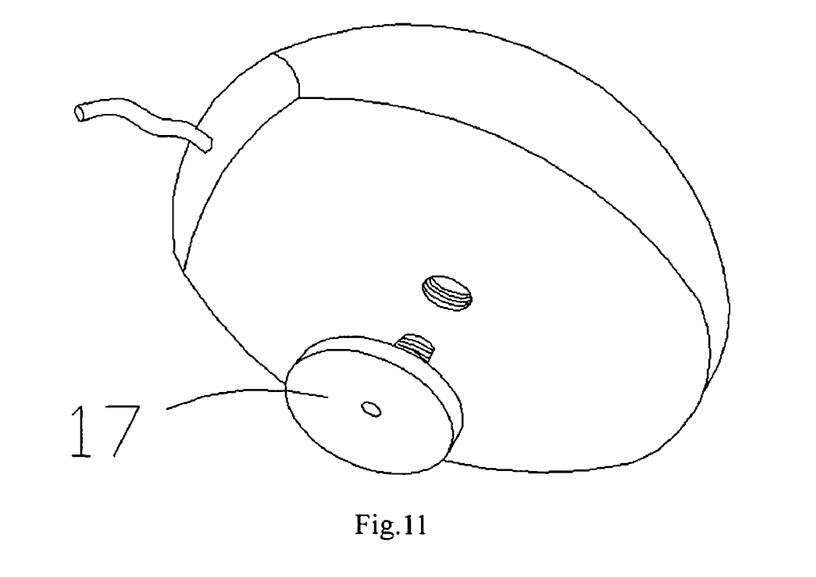
FIG. 11 is a structural schematic view of the fifth embodiment in accordance with the present invention.
Figure 12:
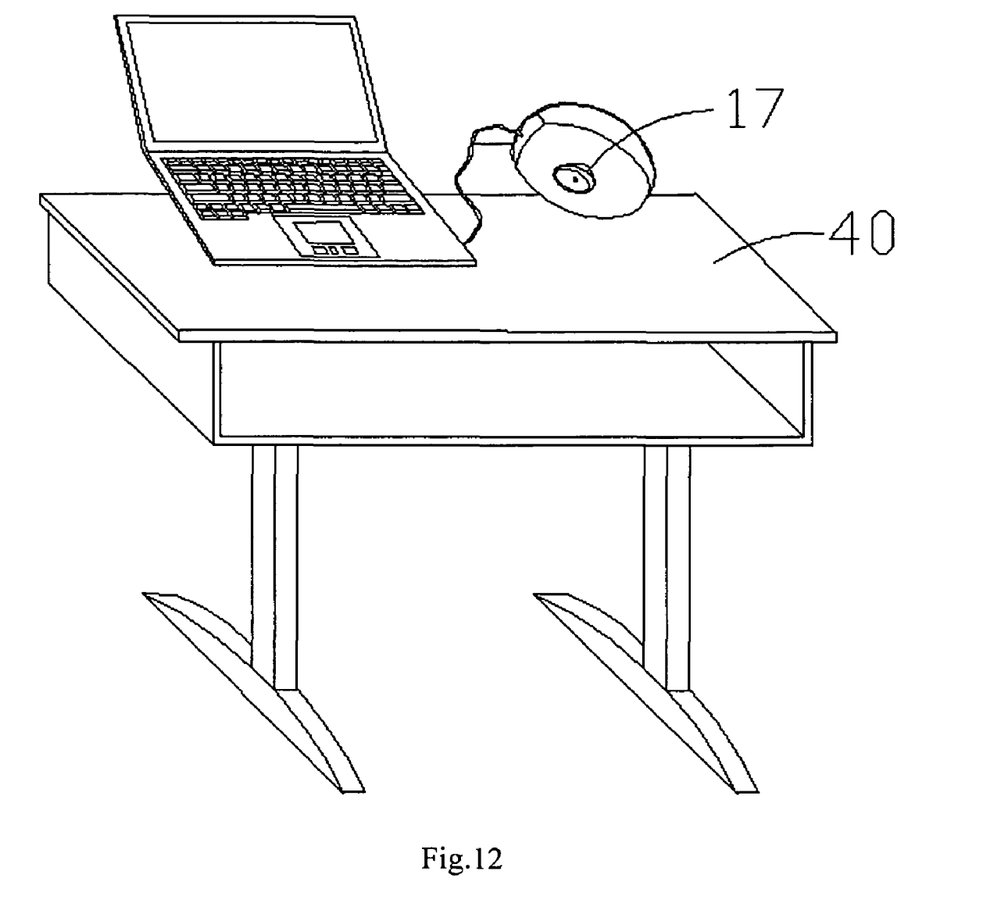
FIG. 12 is a schematic view showing the use of FIG. 11.

Referring to FIGS. 11-12, a magnet 17 is fixedly set on the bottom of the concave housing 1 to engaged with a metal table 40 by magnetic force. It's function is to attract and hold firmly onto the metal table 40.

Figure 13:
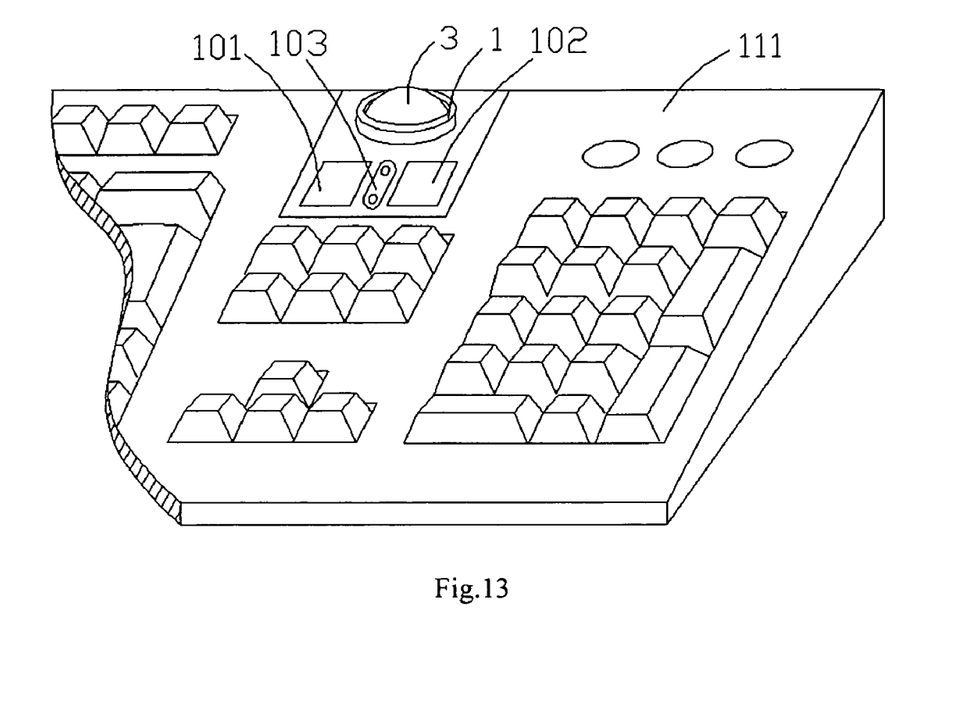
FIG. 13 is a structural schematic view of the sixth embodiment in accordance with the present invention.
Figure 14:
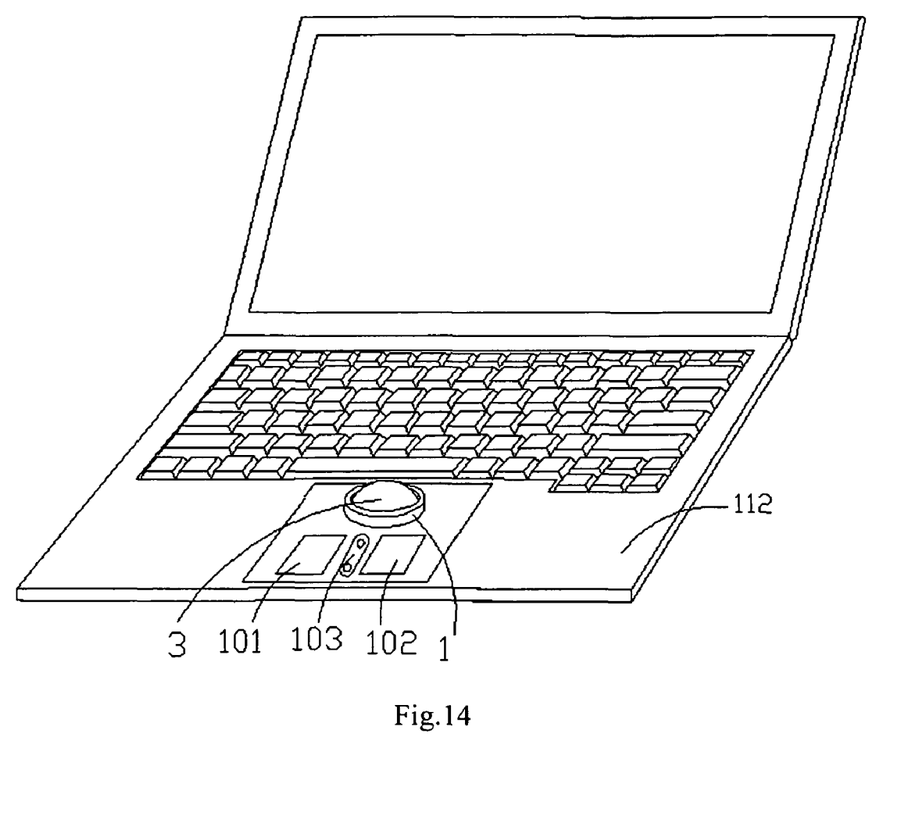
FIG. 14 is a structural schematic view of the seventh embodiment in accordance with the present invention.

Referring to FIG. 13, shows how the operational functions of this invention are designed to incorporate in the key board system. Thus, an inlaid portion is predetermined in a corresponding place of the keyboard 111 for the optical mouse to be placed in. Two functional keys 101, 102 and a rolling key 103 are formed on the front, back, right or left of the rolling ball 3 of the concave housing 1 respectively. In FIG. 14, this invention can also be combined into a note book structure in the same way as the above. This therefore makes it more convenient and flexible for use.

Figure 15:
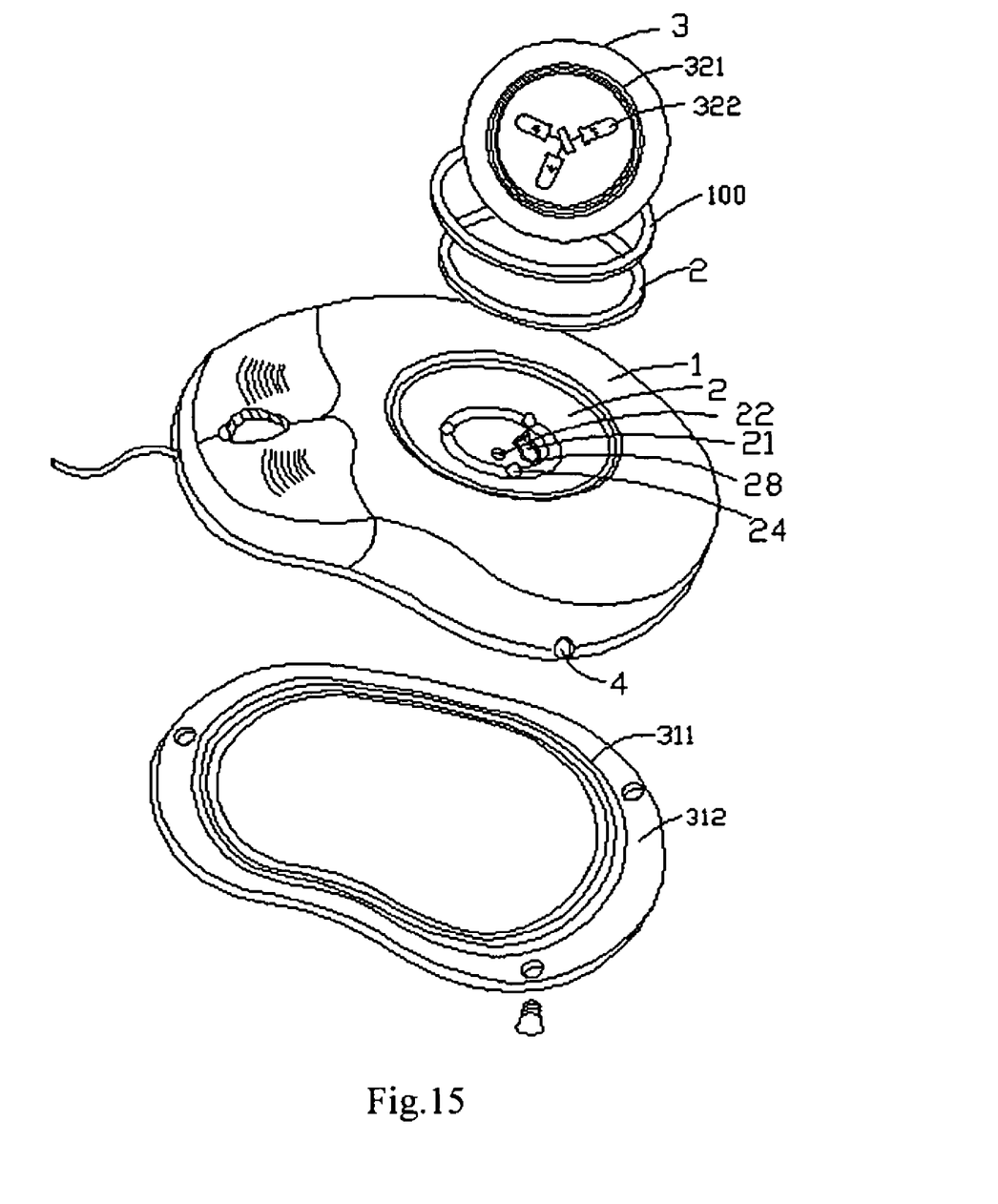
FIG. 15 is a structural schematic view of the eighth embodiment in accordance with the present invention.
Figure 16:
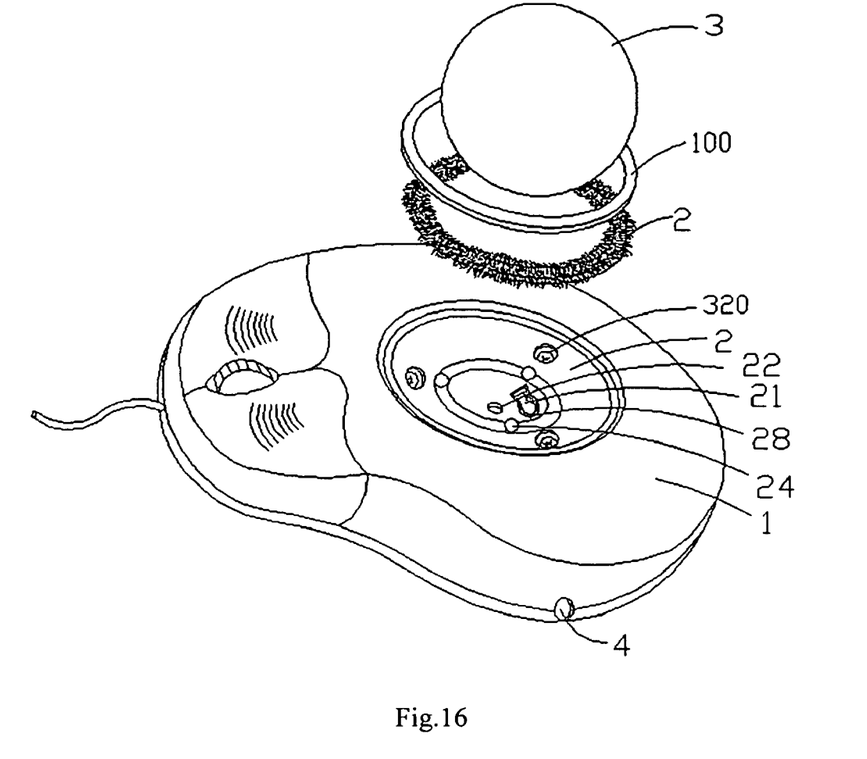
FIG. 16 is a structural schematic view of the ninth embodiment in accordance with the present invention.
Figure 17:
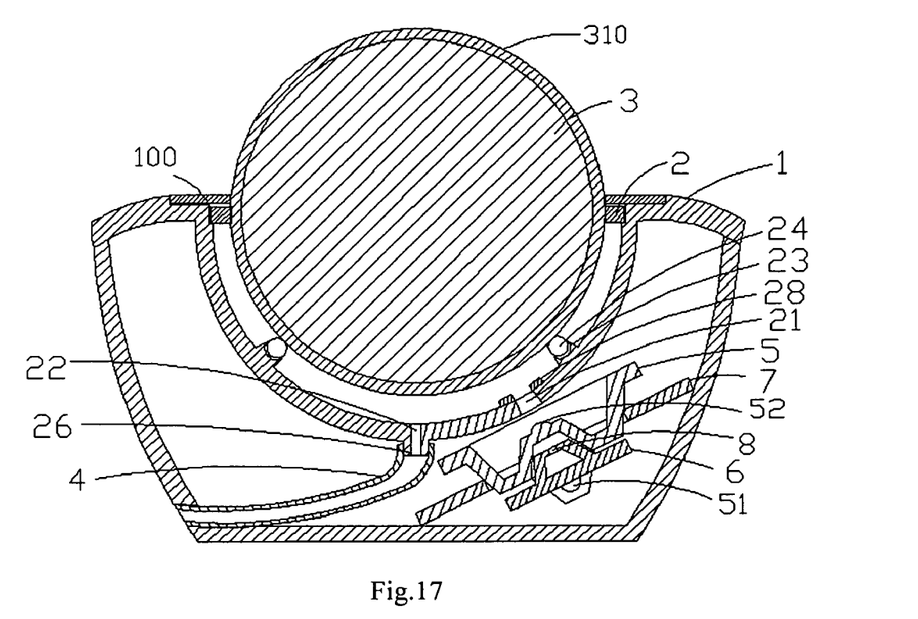
FIG. 17 is a structural schematic view of the tenth embodiment in accordance with the present invention.

Referring to FIG. 15, in the eighth embodiment the rolling ball is transparent. A secondary coil 321 and LEDs 322 connected thereunto are structured within the transparent ball 3. A primary coil 311 corresponding to the secondary coil 321 is also structured on a bottom case 312. This embodiment is to serve as a lighting source not only for night vision but also for decorative effect. Referring to FIG. 16, the rolling ball 3 is lighted by the luminotrons 320 on the housing 1, through glistening effect, with the help of the luminous layer 310. Referring to FIG. 17, the luminous layer 310 is made up of a luminous printing Ink, powder or sheet.

In accordance with the present invention, 1. The usual operating pattern of all optical mouse has been changed through the improved sensitive structure and construction. Unlike the usual, it only requires roll operation of the rolling ball with the aid of corresponding functional keys to achieve the desired operational functions of optical mouse (without moving the mouse body). 2. Most importantly, this new design prevents dust and water from entering its internal circuit in order to improve it reliability and efficiency. 3. Moreover, there are several ways of position for the user to operate, which makes its use more convenient and flexible.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A dustfree and waterproof rolling-ball optical mouse comprising:

a concave housing;

a rolling ball movably engaged with said concave housing;

a dustproof gasket fixed on the concave surface of the concave housing;

a leakage hole of a conduit defined in a center of said concave surface of said concave housing;

an aperture for allowing light through which is eccentrically defined in the bottom of said concave surface of said concave housing;

a waterproof tab formed around the edge of said aperture;

a flex device including an upper lid, a lower lid, a spiral spring and a turnplate;

a track and an elastic ball positioned on said turnplate with a spiral spring and a wire flex coiled in said turnplate; and an adhesive tape formed on an end of said flex.

2. The optical mouse as claimed in claim 1, wherein said dustproof gasket is made of smooth wool strip which forms a plurality of ciliary bodies on the surface to be frictionally engaged with said rolling ball, and a dustproof lid is mounted on said dustproof gasket.

3. The optical mouse as claimed in claim 1, wherein said leakage hole forms a leakage nozzle to cover or insert into one end of said conduit and the other end of said conduit is fixed on an external face of the bottom of said concave housing.

4. The optical mouse as claimed in claim 1, wherein a plurality of slots are arranged on the concave surface of said concave housing and a multiple of corresponding rolling beads are also mounted thereon respectively for movably supporting said rolling ball; said rolling ball has a powdery surface and microdot/gridding surface and preferably the quantity of both slots and beads is three.

5. The optical mouse as claimed in claim 1, wherein a lens and an optical IC are both in turn defined on a printed circuit board below the concave surface of said concave housing.

6. The optical mouse as claimed in claim 5, wherein said lens includes an input convex lens and a sensitive convex lens engaged with said rolling ball.

7. The optical mouse as claimed in claim 6, wherein a light emitting diode is provided to engage with said input convex lens.

8. The optical mouse as claimed in claim 6, wherein a sensitive hole is defined in said optical IC for facing to said sensitive convex lens.

\* \* \* \* \*